US005794220A

United States Patent [19]
Hunt

[11] Patent Number: 5,794,220
[45] Date of Patent: Aug. 11, 1998

[54] METHOD AND MEANS FOR RANKING AND PRICING ITEMS

[75] Inventor: William A. Hunt, Pittsburgh, Pa.

[73] Assignee: Medcom Solutions, Inc., Pittsburgh, Pa.

[21] Appl. No.: 294,219

[22] Filed: Aug. 22, 1994

Related U.S. Application Data

[63] Continuation-in-part of Ser. No. 612,568, Nov. 13, 1990, abandoned.

[51] Int. Cl.$^6$ .................................................. G06F 153/00
[52] U.S. Cl. .......................................................... 705/40
[58] Field of Search ................................. 364/401, 406, 364/408; 395/234, 240; 705/34, 40

[56] References Cited

U.S. PATENT DOCUMENTS 4,912,624  3/1990  Harth et al. .
5,063,506  11/1991  Brockwell et al. .
5,072,379  12/1991  Eberhardt .
5,109,337  4/1992  Ferriter et al. .

*Primary Examiner*—Gail O. Hayes
*Assistant Examiner*—Thanh-Hang Voqui
*Attorney, Agent, or Firm*—Titus & McConomy

[57] ABSTRACT

The present invention provides a computerized method for ranking items based upon the interrelationship of the volumes and revenues and payment methodologies of items sold. First a base rank value is determined based upon the measured distribution of item volume, item revenue and the payor methodology mix. A weighted value is then determined by the computer system for each item by high and low assigned values which are then normalized and sorted to provide a normalized ranking. The pricing of each item is based upon the normalized ranking. The method of the present invention is used to determine what items should increase in price, what items should decrease in price, and what items should remain constant according to each item's relative value to net income.

12 Claims, 8 Drawing Sheets

METHOD AND MEANS FOR RANKING AND PRICING ITEMS

CROSS-REFERENCE TO RELATED APPLICATION

This is a continuation-in-part of U.S. patent application Ser. No. 07/612,568 filed Nov. 13, 1990 entitled Method and Means for Ranking and Pricing Items. Now abandoned.

FIELD OF THE INVENTION

The present invention relates to a method for optimizing payor reimbursement for a business system by ranking salable items based upon the interrelationship of item volumes, item revenues and types of payment and, in particular, to a computerized method and means for ranking items by payor volume mix and payor reimbursement methodology.

COPYRIGHT NOTICE

A portion of the disclosure of this Specification contains unpublished material to which a claim of copyright is made. A notice of copyright has been placed upon such material for notification purposes. The copyright owner has no objection to thee facsimile reproduction of the Specification by anyone as it appears in the United States Patent and Trademark Office's patent file or records, but reserves all other rights whatsoever.

BACKGROUND OF THE INVENTION

The method of the present invention generally relates to the field of digital processing to measure a salable item's relative value according to its pricing relationship to additional relative value. The method is useful in pricing manufactured items or services provided by an organization that has multiplicity of payor payment methodologies that are distinct from one another, such as a hospital.

Ranking items that are sold in order of relative net income producing value is beneficial for decision making as to what price change should be applied to each item and by how much the price change should be increased, decreased or remain unchanged in order to maximize all overall payment.

Each salable item must charge the same unit price to all purchasers or payors regardless of the actual payment methodology. However, certain groups of payors may not pay for such items based on a uniform charge structure, in which case the charge structure may be irrelevant to the actual monies received. In these latter cases, it is important to structure a pricing mechanism that fairly maximizes the business' return.

It is generally known to rank items in relative priority of value to reimbursement prior to pricing. For example, the ranking process may measure the volume of units sold to a particular payor at a value for that measurement. This value would then be measured against all other items for further permutation to reprice the item. Another known ranking process measures the amount of revenue generated from sales of an item to a particular payor and performs calculations necessary to reprice the item.

The ranking process to measure the net value of the unit price of an item may be calculated in a variety of ways. The traditional methods include the straight up/straight down method where maximum and minimum price levels are determined and price increases or decreases are selected from those two levels. Alternatively, a straight line is established between the maximum increase and the maximum decrease in the price and the prices are selected from the linear relationship between those two points. A method known as the full cosine is used where a representative cosine is placed between the maximum and minimum price levels and any increase or decrease in price is established from that cosine. Finally, price increases are selected based on certain payor volume levels.

Each of these methods has its own advantages and disadvantages. For the most part, however, they do not establish a maximized return in a predictable and controllable manner.

Many payors, especially in the health care field, pay for items based on one of the following methods: patient by patient payment, contractual-based payment or a retail-based payment system. Only payors under a retail-based payment system strictly adhere to a unit price structure for payment purposes. Contractual-based and patient-by-patient based payors pay under a mechanism that is either indirectly based on a price structure or on a system completely independent of the price structure.

Heretofore, each item may be sold to all of the differing types of payors and usually is, thereby creating for each item a "payor mix". Measurement of this payor mix, the unit price and the volume of units sold per payor per item, and the billable revenue is the basis for ranking the items in an order of most advantageous to increase the unit price to most advantageous to decrease the unit Price.

Under the multiplicity of payor payment methods, changing unit prices requires a process to measure each item's relative value for a price change as it relates to the effectiveness of the business' net income. A disadvantage of repricing items is present if the ranking of items is ignored. An "across-the-board" method of increasing prices, that is one which uses the same percentage increase to all unit prices, has a reimbursement yield that is not very effective when compared to the total increase to gross revenue.

The present invention overcomes these disadvantages by providing a more effective method of pricing by first ranking items in an order of most advantageous to least advantageous for increasing price and then, based on the ranking process, changing unit prices on some items such that the changes are more productive since the increase in prices relates to the increase in net income to the business. The present invention, thus, takes into account the multiplicity of different payment methods from different payors.

SUMMARY OF THE INVENTION

The present invention provides a computerized method of optimizing payor reimbursement for a business in which the supplies and procedures being sold are ranked according to the carrier mix, relative weighted value and end-user input and the calculated net value of the supply or procedure as determined by the computer system. The user makes assignment of the payor's payment methodology to each volume type and is stored on the computer hard drive. Assignment is derived from a selection of payment mechanisms, each based on the item's volume or other financial data. For each item a weighted value is determined. The weighted value is then used to separate each item by high and low assigned values. These values are then normalized and sorted to provide a normalized ranking. The normalized ranking is then used for pricing each item.

Generally, the method of the invention provides a system for optimizing reimbursements in which salable items are to be ranked and then priced according to a rank value using a general purpose computer. The method comprises the steps of:

(a) uploading into computer storage each procedure used by a payor including such items as the item code number, description, payor volume per each payor, revenue and governmental common classification code;

(b) storing in the memory of said computer storage payor classification information;

(c) entering into storage a payor payment methodology, for each payor volume associated with each item that is stored in said compute storage;

(d) determining from information stored in said general purpose computer a base rank value for each item based upon a payor volume classification mix and revenue and end-user specifications entered into said computer storage, said base rank value being an indication of a potential advantage to be achieved in changing a unit price associated with an item;

(e) determining with the general purpose computer a weighted base rank value for each item;

(f) separating said base rank values by high and low weighted base rank value between a highest base rank value and a lowest base rank value.

In the foregoing embodiment of the invention, the general purpose computer system determines the established unit price of each item being sold by the organization as uploaded from the business data files that identifies each supply or procedure by the procedure code, description, payor volume, and unit prices. It computes the rank value of each item by examining the mix of payors the item has been sold to on a volume basis and end-user input, where the rank value is between 0.0000 through 1.000 or −1.000, after normalization. Upon assignment of the rank value, a new unit price is determined by the computer system and stored on the hard drive, barring the rank value of −1.0000 where the established unit price is unchanged.

The pricing method of items sold is a dynamic process as a means of strategically changing the unit price to yield an overall higher level of payment from certain payors. Items sold are ranked in order of most advantageous to an increase in unit price to those most advantageous to decrease in unit price and this ranking value is stored on the computer's storage.

For each differing payment methodology, the computer system uses a payment formula stored on the hard drive to calculate the payment amount whether this is derived from revenues, clinical diagnosis, expenses or based on a function expenses and revenue. The method also utilizes sufficient data either through electronic uploading into the computer and user input to calculate and recalculate the payment amounts on a carrier-by-carrier basis.

Each payor type is assigned by the end-user a payment methodology which is stored on the computer storage. Based on the prescribed assignment by the user and utilizing the applicable data structure, the method of the present invention calculates the appropriate amount of current payment.

Hereinafter the present invention will be described employing several mathematical representations, however, the invention is not limited to any particular mathematical representation. The interrelationship between payor volume mix, item revenue and payor type is well known to those skilled in the art. The present invention defines what items should increase in price, what items should decrease in price, what items should remain constant. The method of the present invention also determines what items should or should not be changed exclusive of any calculated increase or decrease.

Other advantages of the present invention will become apparent from a perusal of the following detailed description of a presently preferred embodiment of the invention as a computer system implemented with a digital computer taken in connection with the accompanying drawings.

BRIEF DESCRIPTION OF THE DRAWINGS

In the accompanying drawings, a preferred embodiment of practicing the invention is illustrated wherein.

DETAILED DESCRIPTION OF THE INVENTION

The present invention includes the process of sorting data information records in accordance with the contents of one or more specified sort fields for each record. Many of the variables used to describe the method of the present invention are identified in Table 1.

TABLE 1

| | |
|---|---|
| $A_3$ | Average item rank |
| B | Upper price parameter |
| $B_f$ | Balance factor |
| C | % of payment to amount billed |
| D | Product line |
| $D_r$ | Product line revenue |
| $D_x$ | Product line expense |
| $G_e$ | Total business expense per step down |
| $G_r$ | Total business revenue |
| $H_r$ | High rank value of all items rank value |
| $K_r$ | High rank value of all items - rank values less than the average rank value |
| i | Incentive factor |
| $I_n$ | Item or service/procedure for sale |
| J | Number of payors |
| $L_r$ | Lowest rank value of all items rank value |
| F | Number of items for sale that are not frozen |
| M | Payor prescribed payment amount per item |
| $M_j$ | Additional percentage as determined by end user |
| N | Normalization factor |
| Nil | End of product line |
| $Q_o$ | Items original revenue |
| $Q_p$ | Item's new revenue |
| $R_n$ | New total business revenue |
| $R_o$ | Original total business revenue |
| $R_v$ | Rank value of payor volume |
| S | Governmental common classification code |
| $T_n$ | Payment mechanism per payor type |
| $U_m$ | Item original unit price |
| $U_p$ | Item unit price as determined by program |
| $U_r$ | Item revenue |
| $V_p$ | Volume of units sold to a payor per item |
| $P_x$ | Payor Type |
| $W_f$ | Weighted factor as an element of recognition of certain payor volume |
| Y | Lower price parameter |
| $Z_{bc}$ | Item's based rank value |
| $Z_{nr}$ | Item's normalized rank value |

Figure 1A:
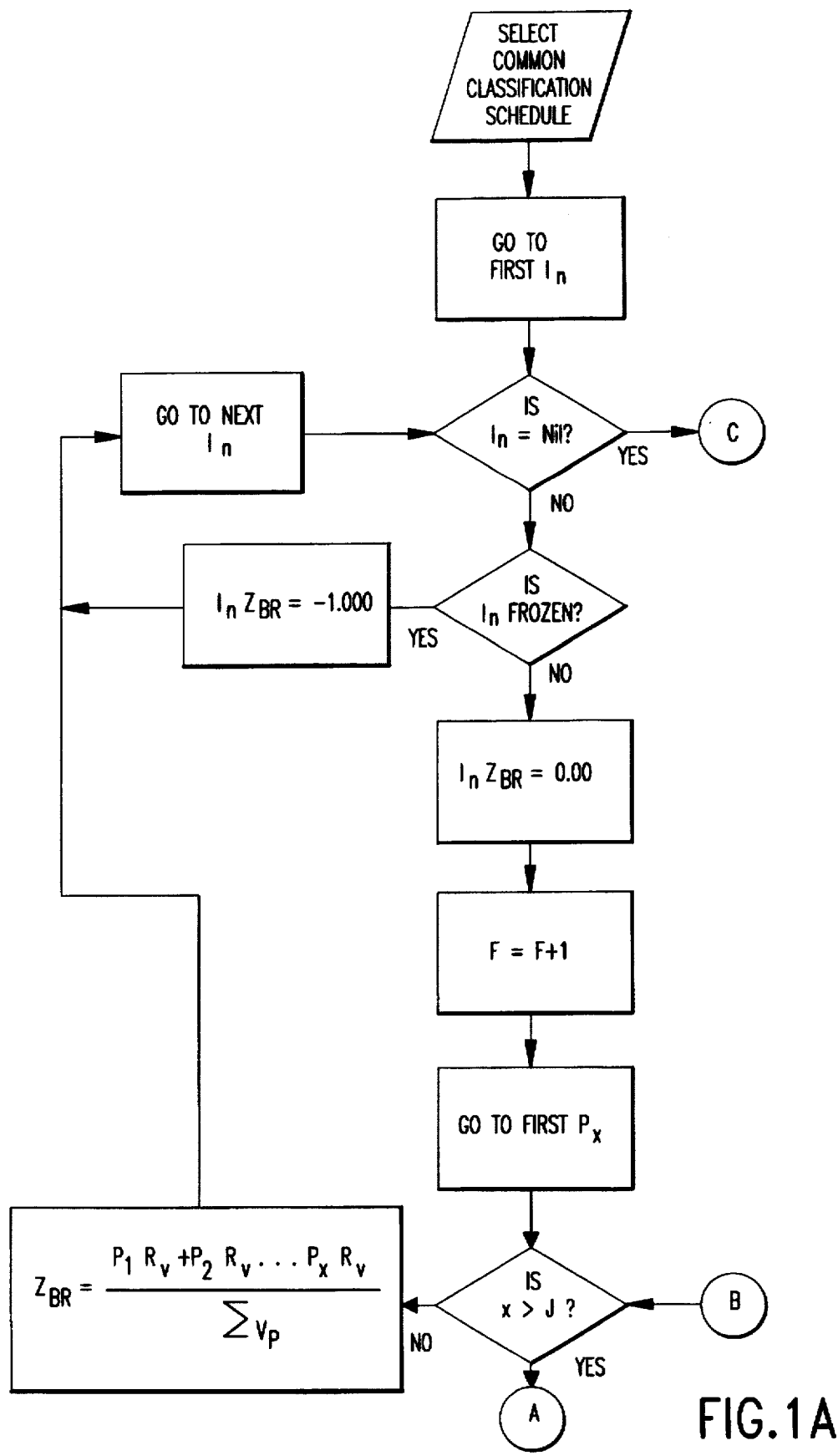
FIGS. 1A–1B are flow charts of the first step that measures an item's payor mix and assigns each item with a base rank value ($Z_{BR}$)

Referring to FIG. 1A, the first step (STEP ONE) of the present invention is to determine an item's base rank value.

STEP ONE

The method starts with a formatted data file created or input by the user that consists of a header and one or more records that are electronically uploaded into the computer system and stored in the computer. As described herein, the preferred data file includes but is not limited to the following information fields:

| (1) | header record that includes the format layout and the payor types | |
|---|---|---|
| (2) | product line code | (D) |
| (3) | item code number | ($I_n$) |
| (4) | item description | |
| (5) | item unit price | ($U_m$) |
| (6) | payor1 volume type 1 | ($P_1V_1$) |
| (7) | payor1 volume type 2 | ($P_1V_2$) |
| (8) | payor1 volume type X | ($P_1V_x$) |
| (9) | payor2 volume type 1 | ($P_2V_1$) |
| (10) | payor2 volume type 2 | ($P_2V_2$) |
| (11) | payory volume type 1 | ($P_yV_1$) |
| (12) | payory volume type 2 | ($P_yV_2$) |
| (13) | governmental common classification code | (S) |

The first process step determines if the record is equal to the end of the file marker (Nil). If so, the method goes to the second step (STEP TWO). If not, the records are searched for a user denotation of being "frozen." Frozen is a characteristic assigned by the user by entering an "X" from the computer keyboard or by the system during the upload process. Typically, an item may be frozen due to any of the following reasons:

(1) no volume/no revenue as determined by the computer system during the electronic upload, (2) unit price is less than $1.00 as determined during the computer system during the electronic upload, (3) retain same unit price as designated by the end-user, (4) manually set the price as designated by the end-user.

If the item is frozen, a base rank value ($Z_{BR}$) Of $-1.0000$ is assigned and retained throughout the following steps.

When an item is not frozen and the end of file marker has not been reached, the item is initially given a base value ($Z_{BR}$) of 0.0000. This item is then counted with the other non-frozen items, where F=F+1, where each non-frozen item is encountered.

Each item record ($I_n$) may contain one or more fields of payor volume ($V_p$). Permutation begins with the first payor volume type followed by a measurement to determine if the payor type ($P_x$) is greater than total number of payors (J) as follows:

$$x > J$$

Figure 1B:
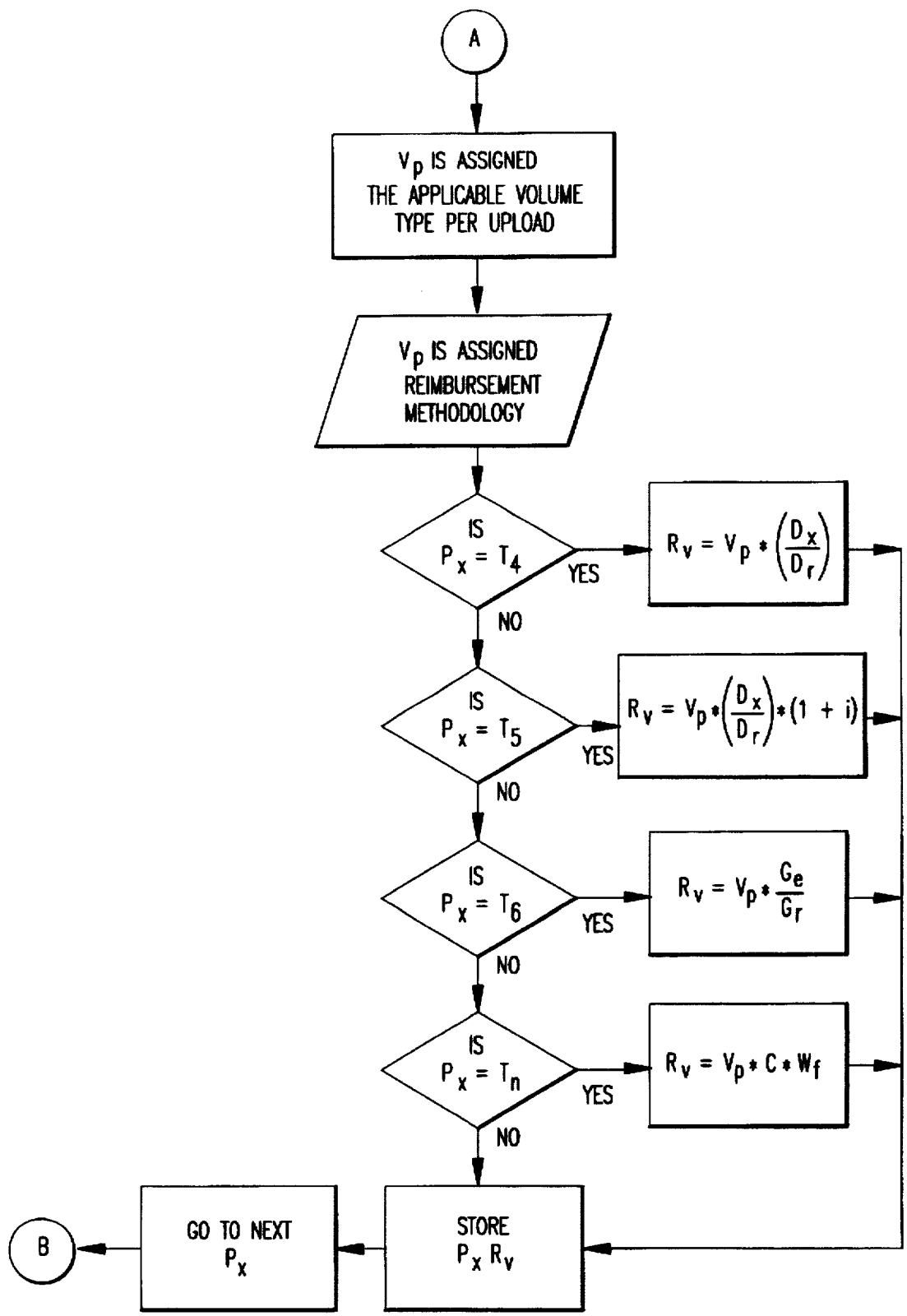

As shown in FIG. 1B, determination is made next as to what payor mechanism ($T_u$) is applicable for $V_1$. When $T_u$ is 1, 2, or 3 the $R_v$ value is held at 0.0000. If $T_u=T_4$, the $R_v$ value is determined by the computer and stored in the computer using the following equation:

$$R_v = |V_p * (D_x/D_r)|,$$

where $D_x$ is the product line expenses and $D_r$ is the product line revenue.

If $T_u=T_5$, the $R_v$ value is determined by the computer and stored in the computer using the following equation:

$$R_v = |V_p * ((D_x/D_r) * (i+1))|$$

where i is an incentive factor designated by the user and based on the payor mechanism.

If $T_u=T_6$, the $R_v$ value is determined by the computer and stored therein using the following equation:

$$R_v = |V_p * G_e/G_r|$$

where $G_e$ is the total business expense and $G_r$ is the business revenue.

If $T_u=T_n$, the $R_v$ value is determined by the computer using the following equation and stored:

$$R_v = ||V_p * C| * W_f|$$

where C represents a percent of the amount billed as payment and n>6 and $W_f$ represents the weighting factor.

The process of determining what payor mechanism is applicable is repeated and the $R_v$ stored in the computer system for access and use thereof.

When X is no longer greater than J the following base rank value calculation is performed by the computer utilizing the following equation for storage and use in the computer:

$$Z_{BR} = \frac{P_1 R_v + P_2 R_v + \ldots + P_x R_v}{V_p}$$

where $Z_{BR}$ is the base rank value of item $I_n$ before further permutations and normalization. The next $I_n$ is processed in the same manner.

STEP TWO

Figure 2:
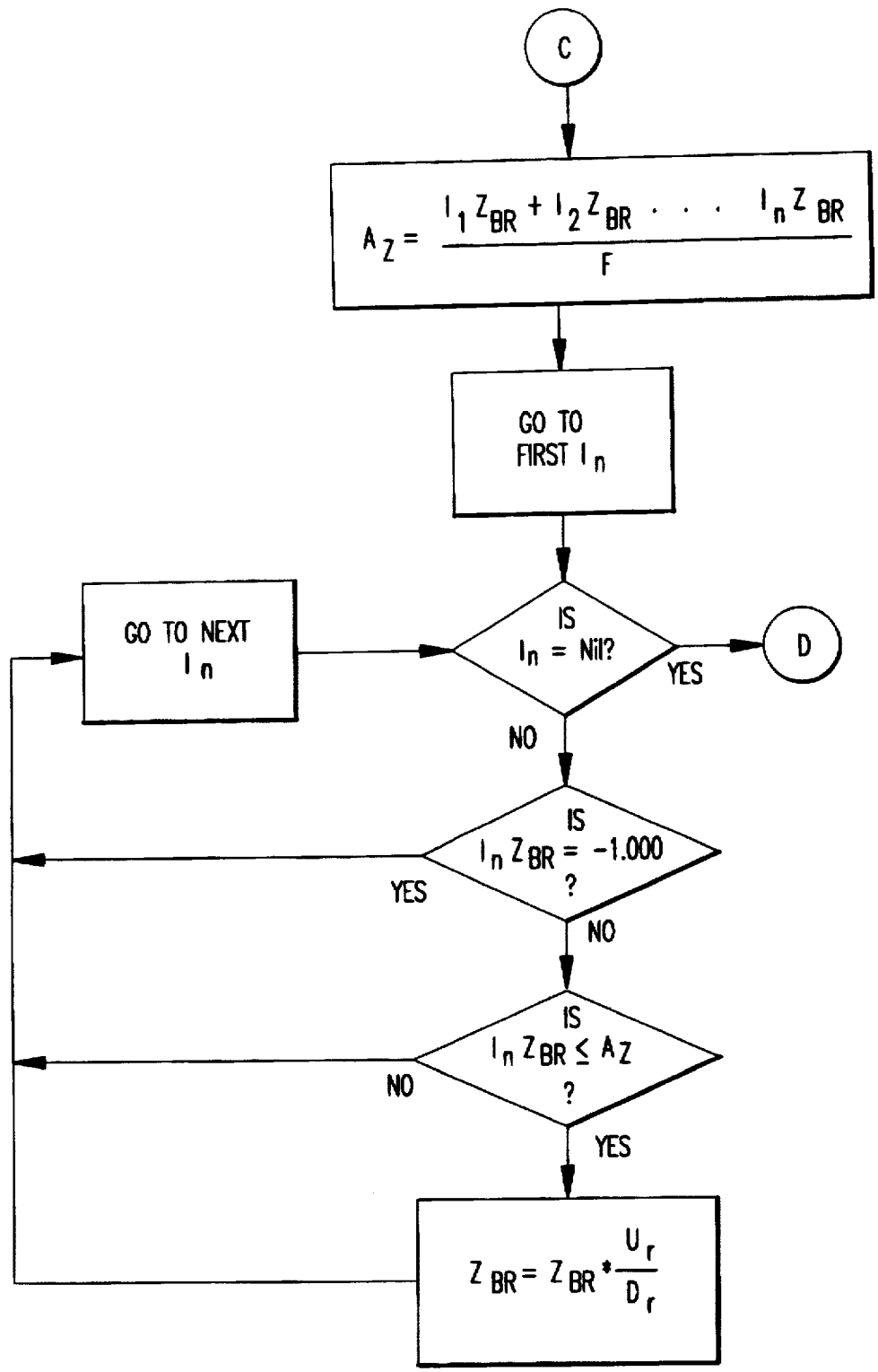
FIG. 2 is a flow chart of the second step used to measure an item's revenue weighted value.

After the base rank value $Z_{BR}$ is assigned in the first step (as shown in FIGS. 1A–1B), the $Z_{BR}$ of each $I_n$ is modified in the second step as shown in FIG. 2 such that it is less than the average rank value ($A_z$). Items with a $Z_{BR}$ rank of $-1.0000$ are excluded from this modification. The average rank ($A_z$) is determined as follows by the computer system and stored by the computer:

$$A_z = \frac{Z_{BR}I_1 + Z_{BR}I_2 + \ldots + Z_{BR}I_n}{F}$$

If the $I_n$ record is equal to the end of file marker (Nil), STEP THREE is commenced. If the $Z_{BR}$ value of $I_n$ is equal to $-1.0000$, the next record is processed. $I_n$ with a $Z_{BR}$ value of $-1.0000$ is stored in the computer system as $-1.0000$.

If $I_n$ is not equal to $-1.000$, the $Z_{BR}$ is measured against the average rank, $A_z$. If the In $Z_{BR}$ value is greater than $A_z$, the next $I_n$ is processed. If the $I_n$ $Z_{BR}$ value is less than or equal to $A_z$, the $Z_{BR}$ value is modified by the ratio of item revenue ($U_r$) to the product line revenue ($D_r$) as follows:

$$Z_{BR} = Z_{BR} * (U_r/D_r)$$

and stored by the computer, replacing the existing stored value of $Z_{BR}$.

STEP THREE

Figure 3A:
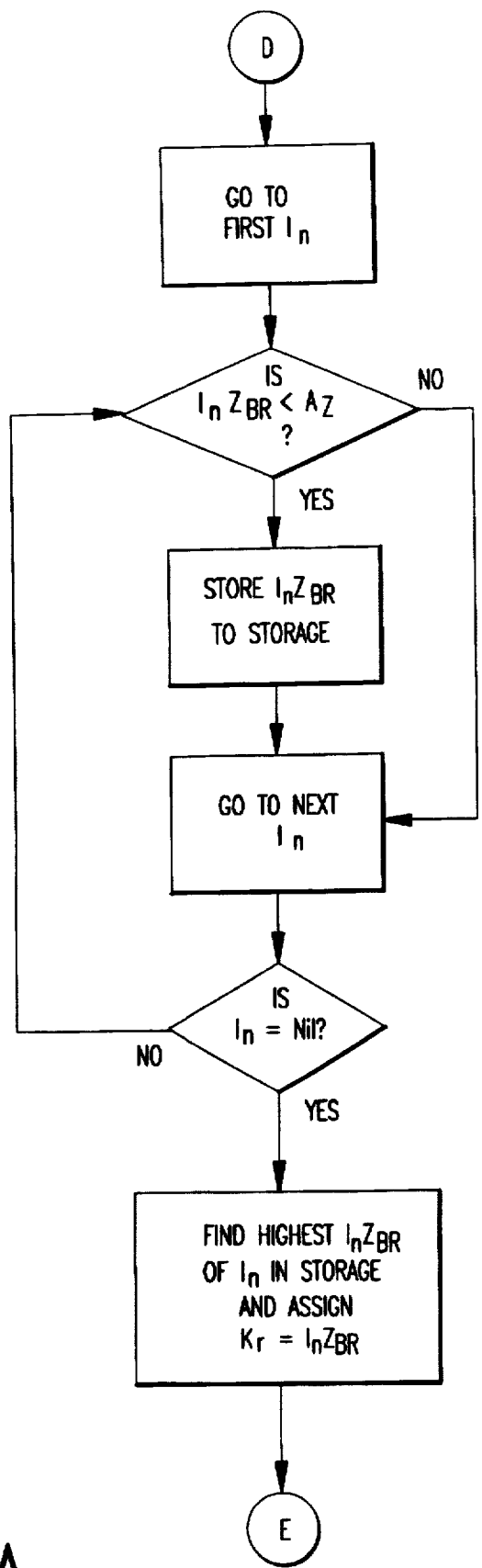
FIGS. 3A–3B are flow charts of the third step of the method used to segregate high and low ranked items.
Figure 3B:
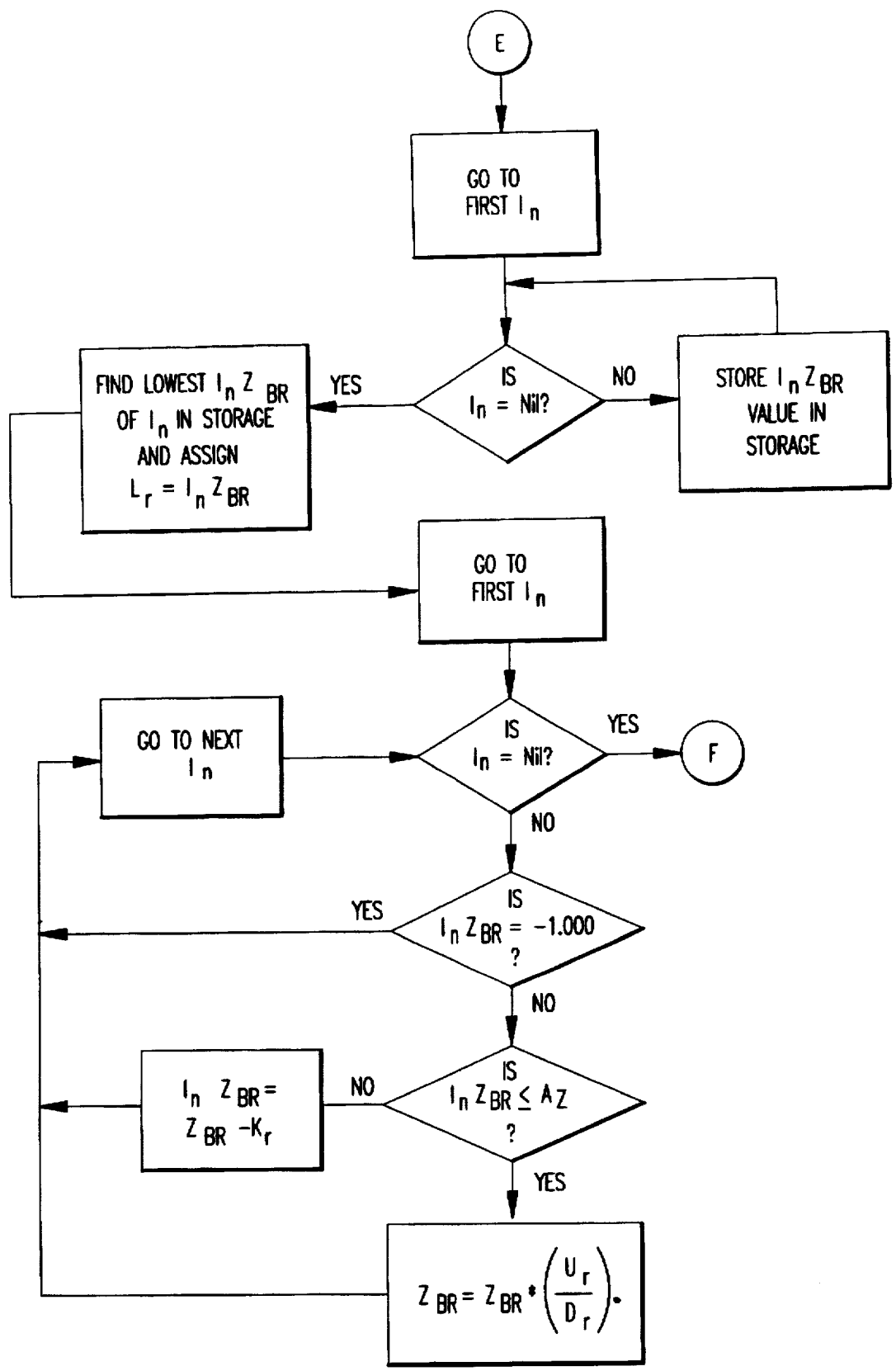

Next, in the third step (STEP THREE) as shown in FIGS. 3A–3B, a "gap" is created between the $I_n$ $Z_{BR}$ values above and below the average product line rank ($A_z$) As shown in FIG. 3B, the $I_n Z_{BR}$ values that fall below $A_z$ are modified or weighted to create an even lower ranking $K_r$ by deducting from the $Z_{BR}$ value in the highest $I_n Z_{BR}$ value that is less than $A_z$. For $I_n Z_{BR}$ values that are greater than $A_z$, the $I_n Z_{BR}$ value is modified or weighted by the ratio of item revenue $(U_r)$ to product line revenue $(D_r)$ as follows:

$$I_n Z_{BR} = (I_n Z_{BR} * Ur/Dr)$$

and stored in the computer system, replacing the existing stored value of $Z_{BR}$.

To determine the item $I_n$ that is greater than the average $A_3$, the computer system determines the highest rank value, Hr, for the $I_n Z_{BR} > A_3$. $H_r$ is stored in the computer for further use. The computer system next determines the lowest rank value of the product line, $L_r$.

Upon completing the determination by the computer system of which $I_n Z_{BR}$ is the highest of those greater than $A_3$ and which is the lowest, modification of the non-frozen $Z_{BR}$ value occurs. Permutation begins by examining if the record is Nil. If it is not, and $Z_{BR}$ is not equal to $-1.000$, the modification occurs as follows:

Determine if the $I_n Z_{BR}$ value is less than the product line average $A_z$.

If $I_n Z_{BR} < A_z$ the new $Z_{BR}$ value for $I_n$ is determined by the computer system and stored on the hard drive as follows: $Z_{BR} = Z_{BR} - H_r$ where the value of $Z_{BR}$ is reduced by the constant $(H_r)$ After it is calculated the next record processed.

If In $Z_{BR} \geq A_z$, the computer system determines the new $Z_{BR}$ value and stores it on the hard drive as follows:

$Z_{BR} = Z_{BR} * (U_r/D_r)$ After it is calculated the next record is processed.

STEP FOUR-Normalization

Figure 4:
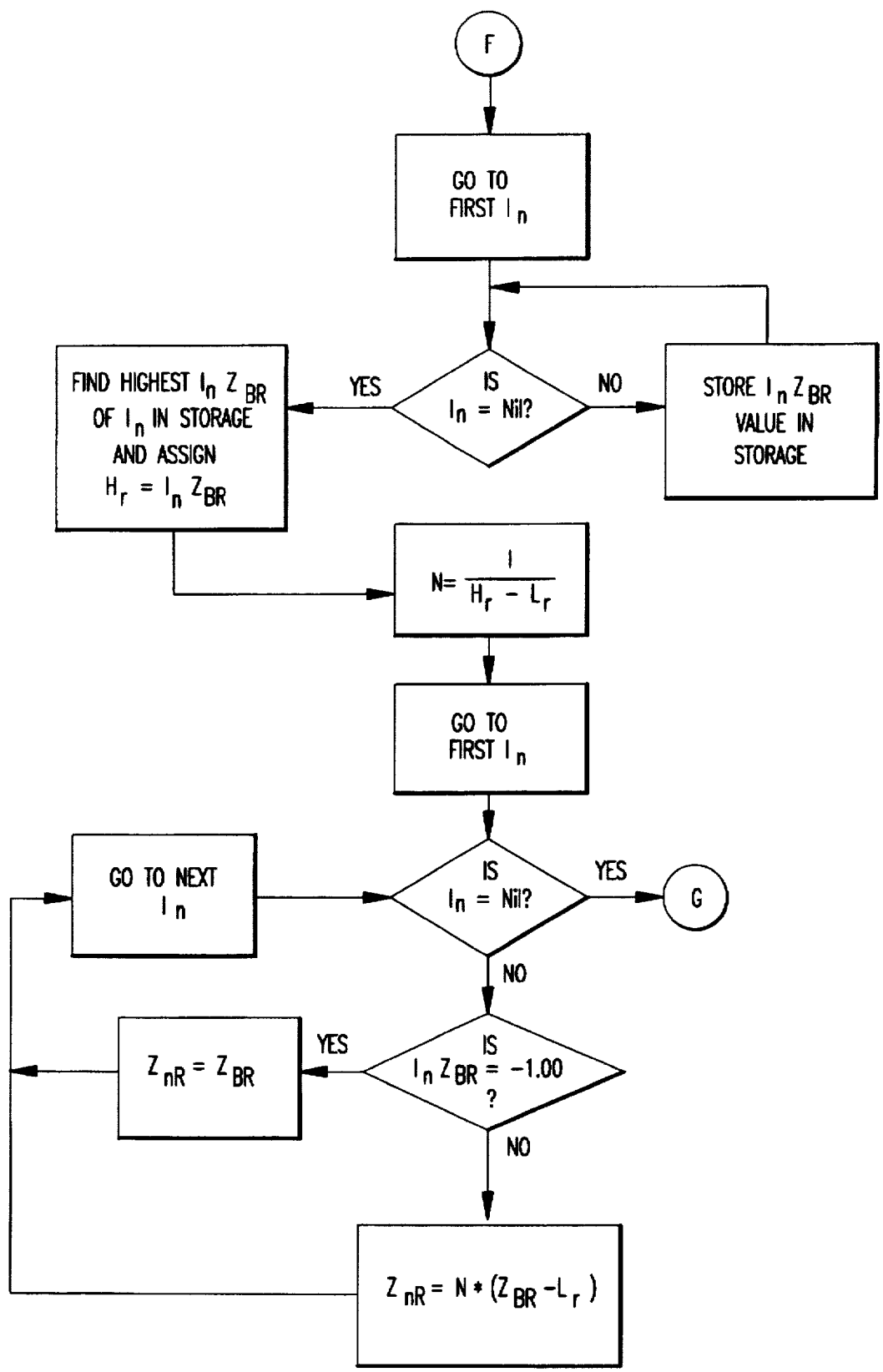
FIG. 4 is a flow chart of the fourth step used to mathematically normalize the ranking distribution, ($Z_{NR}$)

Upon completion of STEP THREE, the weighted base rank values $(Z_{BR})$ are normalized by the computer system in the fourth step (STEP FOUR) shown in FIG. 4 (barring frozen items that have a rank value of $-1.0000$) to fall on a scale of 0 to 1.0000. Placement on this scale is required for pricing the items to optimize payor reimbursement.

A normalization factor (N) is determined by the computer system by dividing 1 by the difference between the highest rank value $(H_r)$ and the lowest rank value $(L_r)$, calculated as follows:

$$N = \frac{1}{(H_r - L_r)}$$

The next In in the product line is examined to determine if $I_n$ is Nil. If so, go to the pricing step in FIGS. 5A and 5B. If not, examine if the In $Z_{BR}$ is $=-1.0000$; if so, $Z_{NR} = Z_{br}$ and then go to the next record; if not, calculate the normalized rank as follows:

$$Z_{NR} = N * (Z_{BR} - Lr)$$

store the $Z_{NR}$ in the computer storage and go to the next $I_n$.

STEP FIVE

After all item unit prices have been ranked via the normalization or designated as $-1.0000$ in STEP FOUR, the fifth step (STEP FIVE) of the process commences wherein changes to the original unit prices are made by either increasing or decreasing an item's unit price to optimize the payment mechanism on a per payor basis per item.

The fifth step involves two iterative changes to the original unit price:

A. Based on the item's normalized rank value $(Z_{NR})$, compared to the product line average rank $(A_z)$, and where the $Z_{NR}$ falls on the normalized axis of a cosine curve will cause the item unit price $(U_m)$ to be either increased or decreased in price. The increase or decrease parameters of $U_m$ are determined by the end-user.

B. Following completion of the initial price change, a second calculation may be performed if selected by the end-user that changes each new unit price by a factor that it balances with the original overall revenue so that there is no material increase nor decrease to the original total organizational revenue.

STEP A

Figure 5A:
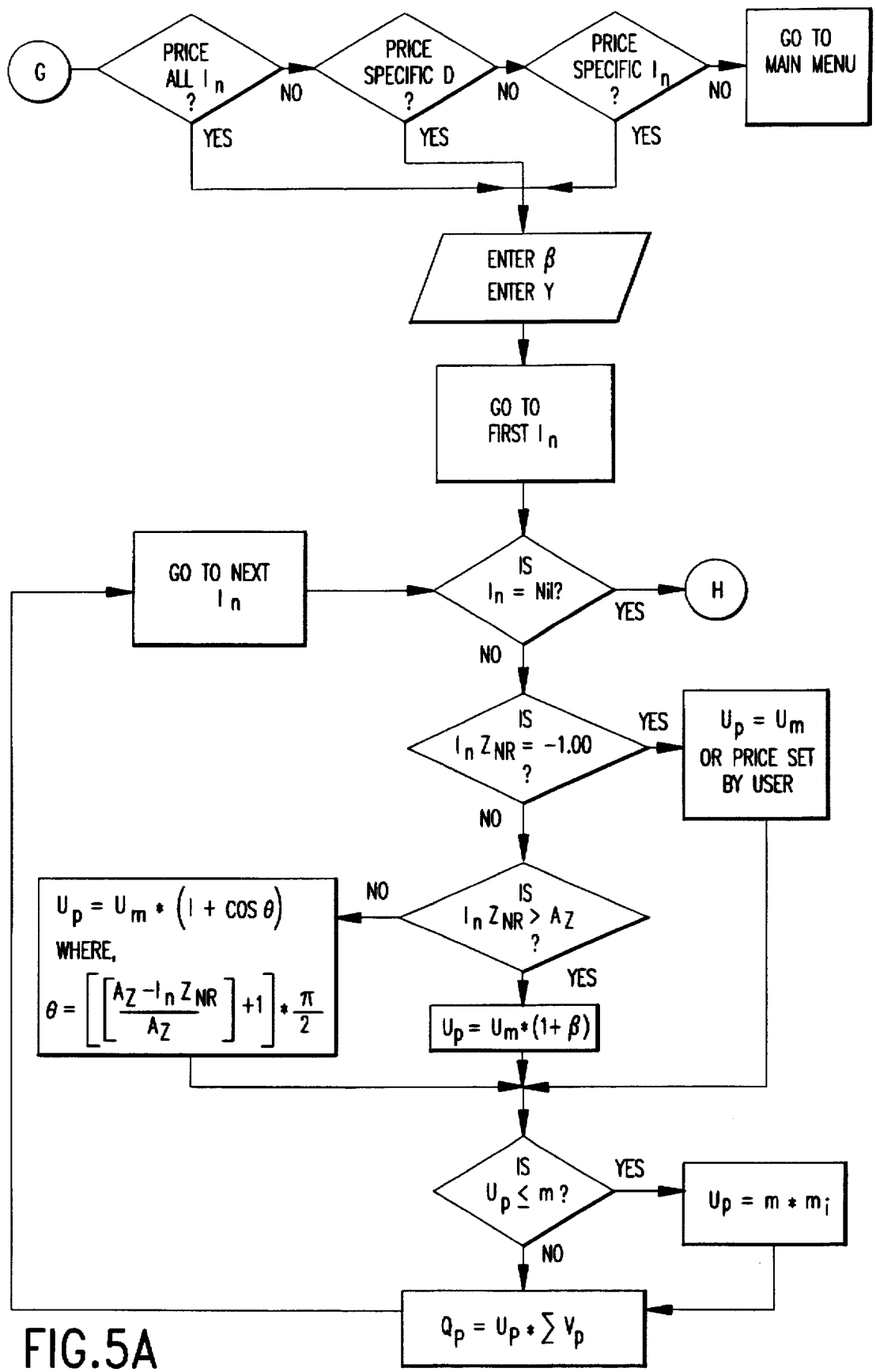
FIGS. 5A and 5B are flow charts of the fifth step used to calculate the new prices of each item based on the normalized rank utilizing the Cos θ (for price decreases) or 1+β (for price increases) times the unit price.
Figure 5B:
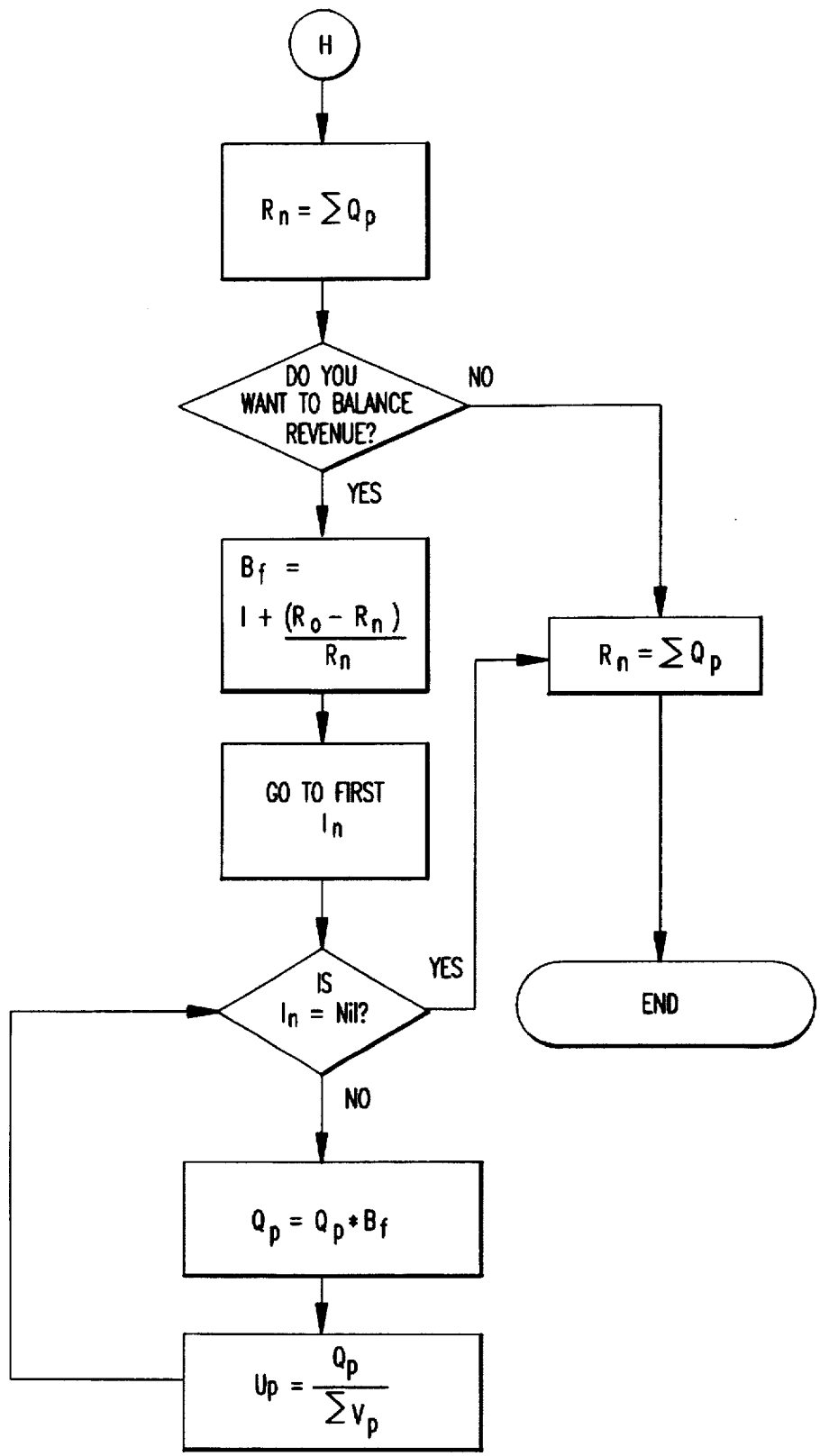

Referring to FIG. 5A, the user enters the possible upper $(\beta)$ and lower $(Y)$ percentage changes on the computer screen for each department or item. These limits are the boundaries within which the unit price for each item is subject to change predicated upon it's position on the X-axis of the cosine curve.

The pricing process begins after ranking has been completed. The first $I_n$ record in the product line is considered. If the record is (Nil), STEP B is performed. If the record has a $Z_{NR}$ of $-1.0000$, the new unit price Up is equal to the original unit price $U_m$ or the unit price as set by the end-user.

Where the $I_n Z_{NR}$ value is greater than the average rank value $(A_z)$, $U_p$ is equal to the $U_m$ multiplied by the upper limit percentage increase in product line as follows:

$$U_p = U_m * (1+\beta)$$

This portion of the pricing deviates from the cosine curve since the unit price increases will not graduate downwards as the curve approaches $\pi/2$, where $\pi/2$ is the midpoint of the x-axis.

When the $I_n Z_{NR}$ value is less than or equal to the average rank value $(A_z)$, Up is equal to one plus the cos $\theta$ times the original unit price $(U_m)$:

$$U_p = U_m * (1 + \cos\theta)$$

$$\text{where } \theta = \left[ \frac{(A_z - I_n Z_{NR})}{(A_z)} + 1 \right] * \frac{\pi}{2}$$

Following determination of $U_p$, either as percentage change or as a frozen item, $U_p$ is measured, based upon the common classification code $S_i$ to check if it's new $U_p$ is less than M, the payor prescribed fee. If it is less, the $U_p$ is recalculated as follows: $U_p = M * M_i$, where $M_1$ is a percentage add-on. Upon completion of if $U_p$ is not less than M, the payor volumes $(V_p)$ for each $I_n$ are summed and multiplied by the Up to calculate the new item revenue $(Q_p)$ as follows:

$$Q_p = U_p * \Sigma V_p$$

$Q_p$ for each $I_n$ is stored on the hard drive. The end-user has the option as to whether the new revenues are to be calculated as follows:

1. Remain as calculated.
2. Balance to the beginning original revenue.

If the end user selects to retain the new unit prices as calculated, their are no further permutations required.

If the end-user selects to balance the new total business revenue to the original total business revenue a factor of $(B_f)$ to balance the new revenue to the original revenue on a per unit price per item basis is determined by the computer system and stored by dividing the difference of the original revenue ($R_o$) and the new revenue ($R_n$) by $R_n$ and adding 1 as follows:

$$B_f 1+(R_o-R_n)/R_n$$

Each item's new revenue ($Q_p$) is then multiplied by Bf to calculate the "balanced" $Q_p$, which is then divided by the item's total volume to arrive at a new unit price Up as follows:

$$U_p = \frac{O_p * B_f}{\Sigma V_p}$$

The new overall revenue ($R_n$) is calculated by summing up and storing all the new revenue ($Q_p$) for each item as follows:

$$R_n = \Sigma Q_p$$

While a presently preferred embodiment of practicing the invention has been shown and described with particularity in connection with the accompanying drawings, the invention may be otherwise embodied within the scope of the following claims.

What is claimed is:

1. A computerized method of controlling transfer, storage retrieval and processing of data on a computerized data processing system comprising at least one computer processor in combination with at least one data storage device and at least one output display in order to execute a methodology of reimbursement optimization in which a plurality of saleable items are ranked according to a selected value and then priced according to the rank selected value, wherein said computerized method comprises the execution of computer program instructions by said data processing system to convert input data representing the pricing attributes of each said slaeble item into one or more output records that represent the outcome of performing said reimbursement optimization on the pricing attributes of each said saleable item, wherein said program instructions execute the following operations;
    (a) inputing data representing the pricing attributes of each said saleable item into said data processing system from at least one external record in order to digitize and store said input data within at least one said data storage device;
    (b) entering said program instructions into said data processing system to execute at least one payment methodology on said input data wherein one of said methodologies is assigned to a payor volume associated with each said saleable item stored;
    (c) using said at least one computer processor to convert said input data into said output records by following said program instructions to execute said methodology, wherein said methodology comprises the following operations:
        (i). generating a base rank value for each said saleable item, wherein said base rank value is based upon pricing attributes that comprise at least a payor volume classification mix and at least one saleable item revenue and other pre-selected specifications, and wherein said base rank value providing an indication of potential advantage to be achieved in changing the pricing associated with a saleable item;
        (ii). determining a weighted base rank value for each said saleable item;
        (iii). using a high and low weighted base rank value to separate said base rank values between a highest base rank value and a lowest base rank value to generate data representing the outcome of said reimbursement optimization;
        (iv). creating output records containing a list of said saleable items in which said price is adjusted by executing said program instructions to apply said ranked optimization to each said saleable item to be repriced.

2. A method as set forth in claim 1, including the step of generating a normalized base rank value by normalizing said weighted base rank value for each saleable item and the step of determining the potential increase or decrease in the value of said saleable item by repricing each saleable item price according to its normalized base rank value.

3. The method as set forth in claim 2 wherein the base rank value of each item can vary from −1.0000 to 1.0000.

4. The method as set forth in claim 2 wherein said price of a saleable item is either end-user inputted or computer-generated and is stored in said data processing system and cannot be changed and is assigned a base rank value of −1.0000 by said data processing system.

5. The method as set forth in claim 4 including the step of pricing each item according to its weighted and separated rank or by its assigned price.

6. The method of set forth in claim 1 wherein said reimbursement optimization is determined for each saleable item by end-user selection of said payment methodology for each payor volume of each said saleable item stored in said data processing system.

7. The method as set forth in claim 6 wherein said classification mix includes a payor payment mechanism and a payor volume for each said saleable item and wherein the weighted base rank value is a weighted revenue volume.

8. The method as set forth in claim 1 wherein a particular base rank between the highest and lowest base rank values is determined by selecting an average of the highest and the lowest base rank values stored in said data processing system.

9. A method as set forth in claim 1 wherein an end-user of said data processing system inputs into said computer a percentage recognition factor of said payor volume for selected reimbursement assignments.

10. A method as set forth in claim 1 wherein said reimbursement optimization comprises the setting of price parameters per individual saleable item independent of a departmental setting.

11. A method as set forth in claim 1 wherein said reimbursement optimization comprises determining the payment level from various payors wherein a price that is lower than the payor's prescribed amount per saleable item initiates recalculation of said price according to parameters set by the end-user.

12. A method as set forth in claim 1 wherein the new total business revenue can be established by the end-user and calculated by said data processing system.

* * * * *